May 26, 1942.　　　　M. A. MÜLLER　　　　2,284,587
REGULATION OF BLOWERS
Filed Jan. 27, 1939　　　　2 Sheets-Sheet 1
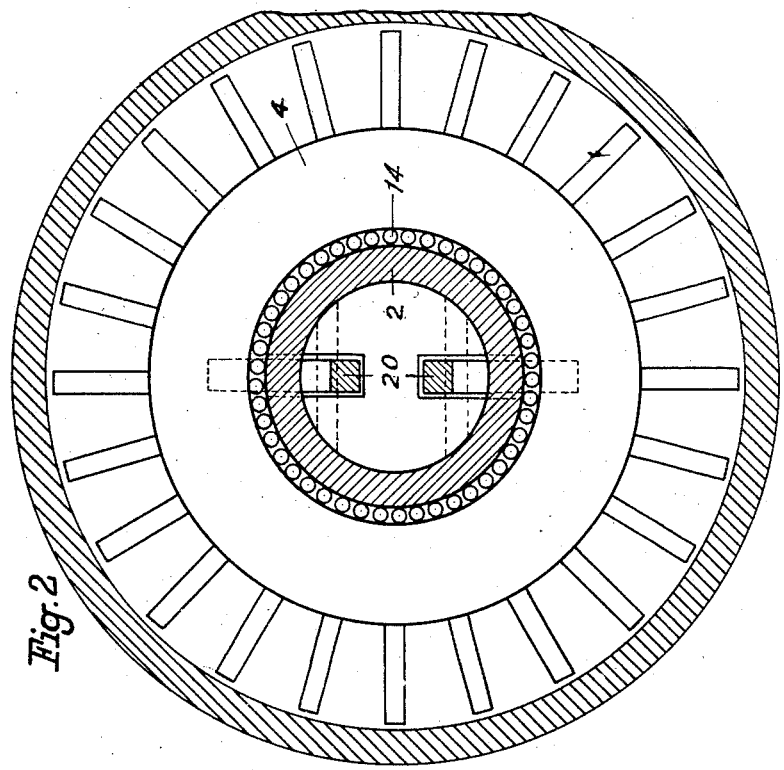
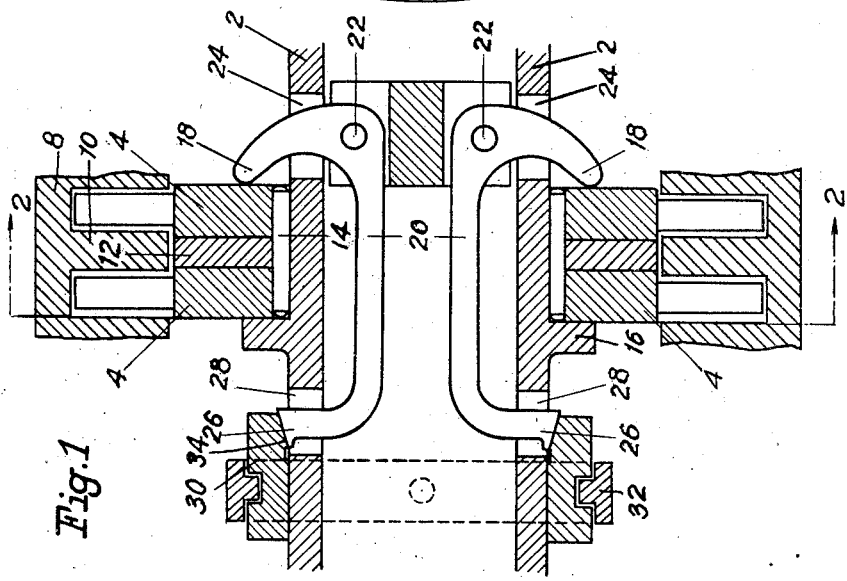
Inventor:
Max Adolf Müller,
Attorneys May 26, 1942.　　　M. A. MÜLLER　　　2,284,587
REGULATION OF BLOWERS
Filed Jan. 27, 1939　　　2 Sheets-Sheet 2

Inventor:
Max Adolf Müller,
Attorneys

Patented May 26, 1942

2,284,587

UNITED STATES PATENT OFFICE 2,284,587

REGULATION OF BLOWERS

Max Adolf Müller, Biederitz, near Magdeburg, Germany, assignor to Junkers Flugzeug-und-Motorenwerke Aktiengesellschaft, a corporation of Germany Application January 27, 1939, Serial No. 253,203

6 Claims. (Cl. 230—114)

This invention is directed to a means for regulating the output of a constant speed, multistage, axial flow blower or compressor.

It is an object of the invention to regulate the load on the output of a multi-stage blower by causing certain impellers to become idle when desired.

A further object of the invention is to cause certain impellers to become idling impellers when desired with but a simple adjusting means, and with a simple bearing construction.

A further object of the invention is to render certain impellers in a blower inoperative by allowing them to idle so that they assume a speed commensurate with the velocity of the air passing thereby, but without giving any impelling action to said air.

Another object of the invention is to provide an apparatus in which impellers are mounted for free rotation upon a driving shaft, and are rotated with a driving shaft by frictional connections therewith.

Generally, in the prior art, the load regulation in axial flow blowers has been accomplished either by removing some of the impeller blades, or by changing the pitch of the impelling blades so that they have no driving function. In the first case, the blower would have to be stopped for the changing of the blades, and in the second case, a very complicated mechanical movement is necessary to change the pitch of the rotating blades. Both constructions present disadvantageous operating problems.

The objects of the instant invention are accomplished by having the impeller blades mounted upon the driving shaft for free rotation with respect thereto, and rotatable therewith by means of a friction clutch, or by having the fixed blades mounted for free rotation within the blower housing, and fixed with respect thereto when desired by means of a friction clutch. Thus, to vary the load in either case, it is only necessary to engage or disengage the clutch so that the blades will, in the first case, be driven by the driving shaft, or, in the second case, be fixed with respect to the housing. Again, both the impeller mounted on the driving shaft and the blades mounted in the housing can be adapted for rotation by using the clutch mechanism, and either or both can be allowed to rotate in order to vary the load upon the blower.

These, and other objects of the invention may be more fully understood by reference to the accompanying drawings, in which:

Fig. 1 is a sectional view of one stage of a multi-stage blower through the drive shaft thereof with two impellers mounted thereon.

Fig. 2 is a sectional view on the line 2—2 of Fig. 1.

Figure 4:
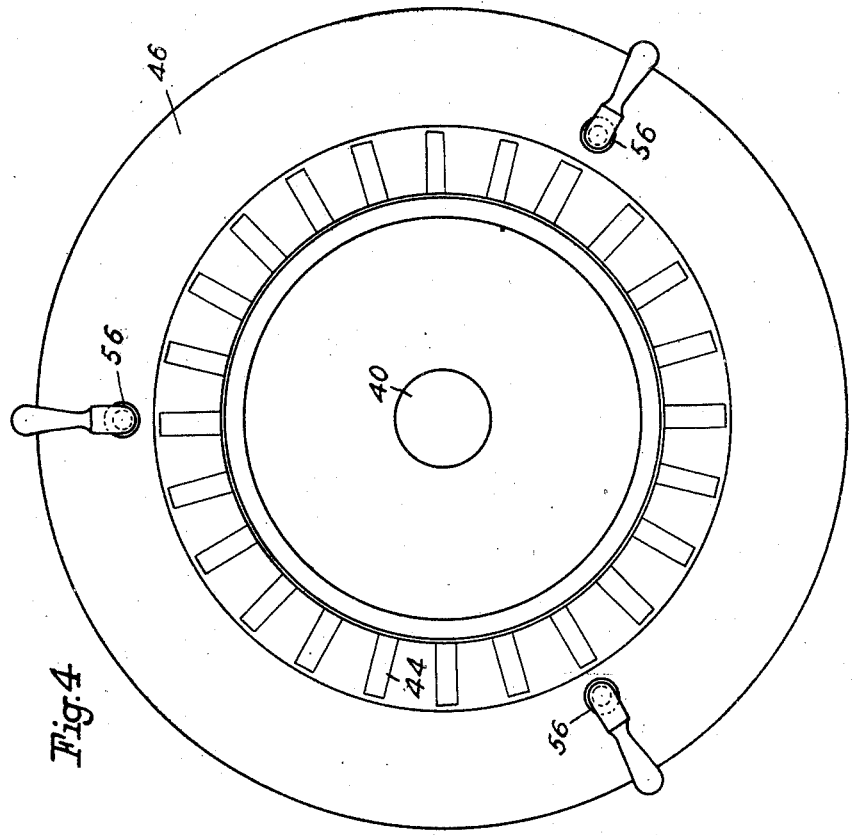
Fig. 4 is a side elevational view of Fig. 3.

In Fig. 1 a drive shaft 2 has mounted thereon an impeller consisting of a ring or hub 4 and blades 6. Said shaft and impeller rotate within a housing 8 having fixed blades 10. There are two impellers shown which are separated by a spacing ring 12. Both impellers and the spacing ring are journalled upon shaft 2 through the medium of an anti-friction bearing comprising the needle rollers 14. Thus, the impellers can freely rotate upon the shaft 2.

In order to fix the impellers with respect to shaft 2, the following clutch mechanism is provided: An annular flange 16 extends from shaft 2, against which the impeller hub may bear. The other side of the impeller hub is contacted by the end 18 of a bell crank 20, said bell crank being pivotally mounted within hollow shaft 2 at 22, with end 18 extending through aperture 24 in shaft 2. The other end 26 of bell crank 20 is provided with a bevelled surface and projects through aperture 28 in shaft 2. The bevelled surface of end 26 is adapted to be contacted by a collar 30 slidably mounted upon shaft 2, said collar being manipulated, for example, by a fork 32. Collar 30 has a tapered surface 34 which contacts the tapered surface on the end 26 of bell crank 20.

When collar 30 is slid to the right in Fig. 1, surface 34 engages the end 26 of bell crank 20, which pivots said bell crank about 22 and brings end 18 into engagement with hub 4 of the impeller, forcing the impeller to the left and into frictional engagement with the annular flange or shoulder 16. Thus, the impeller is clutched to drive shaft 2 and moves therewith.

By moving the collar 32 to the left in Fig. 1, the clutch is disengaged and the impeller rotates freely with respect to shaft 2. Thus, if the load upon the blower is decreased, and the impeller is declutched from the drive shaft in order to cut out one stage of the blower, the impeller will assume a speed dependent upon the flow of the air coming from a previous stage and passing through the blades of the disconnected stage, and not dependent upon the speed of drive shaft 2. In other words, the impeller no longer drives the air, but is driven by the air. The decrease in velocity of the impeller can be shown by simple graphic investigation to be very small, so that the difference in speed between the freely rotating impeller and the drive shaft 2 is small. Consequently, the bearing 14 and the clutch need be of but light and simple construction, as only small forces are involved in the clutching operation.

Figure 3:
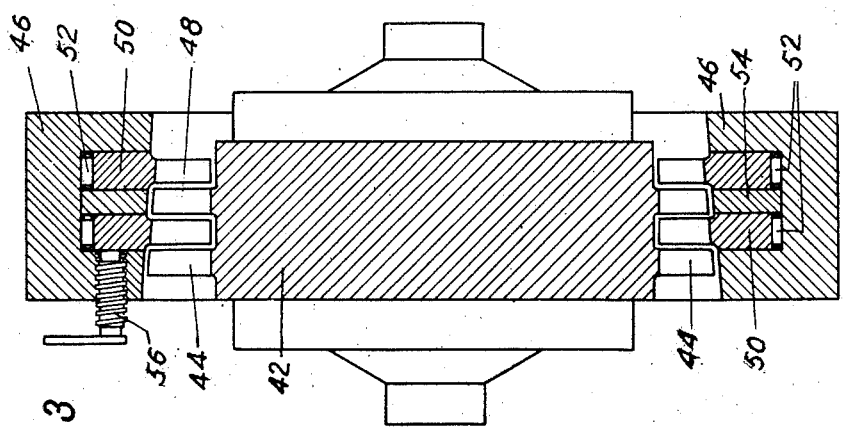
Fig. 3 is a sectional view through a modified form of multi-stage blower in which the blades mounted upon the housing are adapted for rotation.

The construction of Figs. 3 and 4 shows the same system employed with the blades fixed to the housing and declutchable from the housing. Thus, drive shaft 40 drives impeller 42 having fixed blades 44. Mounted within housing 46 are blades 48 which are secured to an annular ring 50. Ring 50 is journalled in housing 46 for free rotation with respect thereto by means of anti-friction bearings, such as the needle rolling bearings 52. As in Fig. 1, two sets of blades are shown, the blades in Fig. 3 being separated by a ring 54. Clamp screws 56 are joined to the housing for the purpose of clutching the rings 50 and holding them against rotation by forcing them against the side of the housing, or for declutching the rings 50 and allowing them to move freely within the housing by releasing the rings from the side of the housing and allowing the rings to rotate upon bearings 52.

In the operation of this modification, the rings 50 are declutched in order to decrease the load upon the blower. On declutching, the rings 52 rotate freely within the housing with a speed which is determined by the velocity of the air produced through the blower from the remaining stages. In other words, the air drives the blades, and blades 48 provide no impelling action on the air. As in Fig. 1, the speed of the rings 50 is small with respect to the bearing, and consequently the bearing and the clutching mechanism may be of very light and simple construction, inasmuch as only small forces are involved. To increase the load upon the blower, the rings 50 are clutched to the housing by means of clamp screws 56, the blades 48 being then fixed and the air passing through the blower is again reversed so that the blades 44 on the impeller again produce work.

Compared with the arrangements hitherto known for regulating the pressure respectively the velocity of air delivered by the compressor respectively the blower, the arrangement according to the invention offers the advantage of a simple construction and increased reliability. Moreover the regulation of the pressure respectively the velocity of the delivered air is achieved by means, arranged per se, whereby the reliability of the compressor respectively the blower is further increased. Finally it is possible to regulate the pressure or the velocity of the delivered change while the compressor respectively the blower is running.

Having now described means by which the objects of my invention are obtained, what I claim is:

1. A load regulating device for a multi-stage axial flow blower having a plurality of rings of rotor blades mounted upon a shaft member and associated rings of stator blades mounted upon a housing member, comprising first means for mounting the rings of blades upon at least one of the members for free rotation thereon, and second means for clutching separate rings of said blades to their respective member, whereby a stage of said blower is selectively disconnectable and the thus freely rotatable blades are rotated by air flow from the remaining stages.

2. A load regulating device for a multi-stage axial flow blower having a hollow drive shaft, an impeller mounted on said shaft, and a housing, comprising anti-friction bearing means between said impeller and said shaft, a stop fixed to said shaft engageable with one side of said impeller, a bell crank pivotally mounted within said shaft, a first end of said bell crank projecting through said shaft and engageable with a second side of said impeller, a collar slidably mounted upon said shaft, and means for moving said collar into engagement with the other end of said bell crank for pivoting said bell crank to bring said first end into engagement with said second side and said first side into engagement with said stop.

3. A load regulating device for a multi-stage axial flow blower comprising a rotor having an impeller fixed thereto and a housing having reversing blades mounted therein, anti-friction bearings between said blades and said housing, and clutch means for detachably fixing said blades with respect to said housing.

4. A load regulating device for a multi-stage axial flow blower comprising a hollow driving shaft, a ring, a plurality of blower blades mounted upon said ring, means mounting said ring upon said shaft, a bell crank mechanism pivoted within said shaft, and having an arm for engaging one side of said ring, and an annular flange about said shaft on an opposite side of said ring, said bell crank and flange forming a clutch for engaging opposite sides of said ring.

5. A load regulating device for a multi-stage axial flow blower comprising a rotor member and a housing member, a ring, a plurality of blower blades secured to said ring, means mounting said ring upon said housing member for free rotation thereon and for impelling air through said blower, and clutch means between said ring and said housing member for engaging and disengaging said ring with said housing member.

6. A load regulating device as in claim 5 said mounting means comprising antifriction bearings between said ring and said housing member, and said clutch means comprising clamp screws in said housing member and engageable with said ring.

MAX ADOLF MÜLLER.